Patented Nov. 5, 1946

2,410,782

UNITED STATES PATENT OFFICE 2,410,782

PRESERVATION OF RUBBER

Albert F. Hardman, Akron, Ohio, assignor to Wingfoot Corporation, Akron, Ohio, a corporation of Delaware No Drawing. Application October 20, 1942, Serial No. 462,743

5 Claims. (Cl. 260—808)

This invention relates to the preservation of rubber. More particularly, it relates to the provision of a new class of age resisters which, when incorporated into rubber, markedly improve the ageing characteristics of the rubber and its resistance to deterioration.

Various materials for improving the ageing characteristics of rubber are known. To a certain degree the action of these age resisters is somewhat specific in that some of them are particularly effective in retarding the absorption of oxygen by the rubber; others are particularly effective in improving flex life; some are especially effective in retarding surface checking or cracking; some are particularly effective in retarding high temperature deterioration. Many age resisters combine certain of these functions.

According to the present invention a new class of age resisters has been discovered, which compounds are very effective and compare favorably with existing commercial materials.

The age resisters of the invention may be designated N-arylamino aryloxy acetic acids and their salts, amides and esters. The preparation of these materials may be illustrated by the following example for the preparation of a specific compound falling within the class, namely, N-phenylamino-p-phenoxy acetic acid.

One hundred grams of p-hydroxy diphenylamine and 45 grams of sodium hydroxide were dissolved in 500 cc. of water. The solution was filtered, and to it were added 50 grams of chloracetic acid dissolved in 100 cc. of water. The mixture was diluted to a total volume of 1 liter and heated to 90–95° C. on a steam bath for three hours. The mass was then cooled and the thick suspension formed was filtered off. This product was washed with a little water containing sodium chloride. It was the sodium salt of N-phenylamino-p-phenoxy acetic acid. The yield was 120 grams. The free acid was obtained by treating the solution of the sodium salt with dilute sulfuric acid. The precipitate obtained by the sulfuric acid treatment was filtered, washed and dried and after recrystallizing from toluene, the product melted at 145° C. Analysis showed a nitrogen content of 5.87%, while the theoretical value calculated for N-phenylamino-p-phenoxy acetic acid is 5.77%.

It has been found that the free N-arylamino aryloxy acetic acids may be used as age resisters in rubber compositions and, also, that the carboxylic radical in these compounds may be modified by conversion to salts, esters or amides while retaining the age-resisting properties.

The salts, esters and amides may be prepared from the free acids by conventional methods. Thus, metal salts are readily prepared by treating the free acid with the corresponding metal base; ammonium salts, including substituted ammonium salts, may be prepared by treating the free acid with ammonia or an amine; the esters may be prepared by treating the free acid with an alcohol; and the amides may be prepared by heating the corresponding ammonium salt to eliminate water.

Various other N-arylamino aryloxy acetic acids may be prepared by replacing the p-hydroxy diphenylamine of the foregoing example with other hydroxy diaryl amines. These acids may be represented by the structural formula

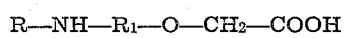

R—NH—R$_1$—O—CH$_2$—COOH in which R is aryl and R$_1$ is arylene. Further representative examples of the class of N-arylamino aryloxy acetic acids are the N-phenyl amino naphthoxy acetic acids, the N-naphthylamino phenoxy acetic acids, the N-phenyl amino phenoxy alpha methyl acetic acids, etc. In addition to the parent N-arylamino aryloxy acetic acids, one may also employ as age resisters, those derivatives containing alkyl, aralkyl, alkoxy, aryloxy and other substituents which do not detract from the effect of the age resister.

The salts coming within the invention include both salts of metals, such as sodium, potassium, zinc, cadmium, calcium, barium, strontium, lead, magnesium, mercury, etc., and ammonium salts and substituted ammonium salts prepared by reacting the free acid with ammonia or various aliphatic or aromatic amines, such as methyl amine, ethyl amine, tetrahydro furfurylamine, cyclohexyl amine, the naphthylamines, the tetrahydro naphthylamines, dimethyl amine, methyl aniline, benzylamine, diphenylamine, the tributylamines, etc.

The amides may be prepared from the corresponding ammonium and amine salts by heating to eliminate water.

Various alcohols may be reacted with the free acid to produce esters, including ethyl alcohol, the amyl alcohols, benzyl alcohol, methyl alcohol, isopropyl alcohol, isobutyl alcohol, n-butyl alcohol, etc. Aromatic esters derived from phenolic compounds may also be used. These may be prepared by reacting the acyl chloride of the N-arylamino aryloxy acetic acid with an alkali metal phenate such as sodium phenate, sodium naphtholate, etc.

Representative compounds falling within the invention were tested as age resisters for rubber in the following test formula:

| | Parts by weight |
|---|---|
| Extracted pale crepe | 100 |
| Zinc oxide | 5 |
| Sulfur | 3 |
| Stearic acid | 1.5 |
| Hexamethylene tetramine | 1 |
| Antioxidant | 1 |

The stocks were vulcanized at 285° F. to what was judged to be the optimum cure and tested for tensile strength, and then were aged for six days in an oxygen bomb at 50° C. and 150 pounds per square inch oxygen pressure and re-tested. A sample compounded according to the same formula, and using phenyl-beta-naphthylamine, a well-known commercial age resister, as the antioxidant was used as a control. The following table shows the results obtained, the percentages being the percentage effectiveness of the age resister as compared with phenyl-beta-naphthylamine.

| | Per cent |
|---|---|
| N-phenylamino-p-phenoxy-acetic acid | 93 |
| N-o-tolylamino-p-phenoxy-acetic acid | 99 |
| Sodium N-phenylamino-p-phenoxy-acetate | 103 |
| Zinc N-phenylamino-p-phenoxy-acetate | 94 |
| N-phenylamino-p-phenoxy-acetanilide | 88 |
| N-phenylamino-p-phenoxy-p-hydroxy-acetanilide | 95 |

Within the range of experimental error, all of these may be said to be substantially equal in antioxidant value to the standard phenyl-beta-naphthylamine.

Some of the age resisters of the invention, such as the sodium and ammonium salts and others, are water soluble and are thus particularly suitable for use in latex and other aqueous dispersions of rubber.

As used herein and in the claims, rubber includes natural rubber, both crude and reclaimed, and various synthetic rubbers which are similarly subject to deterioration through ageing.

I claim:

1. The method of preserving rubber which comprises incorporating therein an amide of an N-aryl amino aryloxy acetic acid.

2. The method of preserving rubber which comprises incorporating therein an amide of an N-aryl amino phenoxy acetic acid.

3. The method of preserving rubber which comprises incorporating therein an amide of N-phenyl amino phenoxy acetic acid.

4. The method of preserving rubber which comprises incorporating therein N-phenylamino-p-phenoxy acetanilide.

5. The method of preserving rubber which comprises incorporating therein N-phenylamino-p-phenoxy-p-hydroxy acetanilide.

ALBERT F. HARDMAN.